Figure 1:
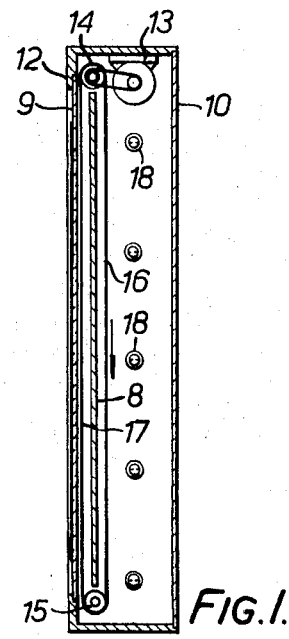

United States Patent [19]
Henderson et al.

[11] 3,836,240
[45] Sept. 17, 1974

[54] MOIRE FRINGE OPTICAL DISPLAY & PROJECTION EQUIPMENT

[75] Inventors: David Alexander Whyte Henderson; Brian Thomas Crawford, both of Cheltenham, England

[73] Assignee: Pennant Display & Engineering Limited, Cheltenham, England

[22] Filed: Nov. 20, 1972

[21] Appl. No.: 307,943

[30] Foreign Application Priority Data
June 7, 1972  Great Britain.................... 26452/72
July 7, 1972  Great Britain.................... 31862/72
July 18, 1972  Great Britain.................... 33513/72

[52] U.S. Cl................................ 352/87, 40/106.51
[51] Int. Cl.......................................... G03b 21/32
[58] Field of Search........ 352/50, 52, 87; 40/106.51

[56] References Cited
UNITED STATES PATENTS
2,374,371  4/1945  Morch ................................. 352/87
2,876,570  3/1959  Swarbrick..................... 40/106.51 X
3,683,419  8/1972  Lewis............................ 40/106.51 X

*Primary Examiner*—Monroe H. Hayes
*Attorney, Agent, or Firm*—Young & Thompson

[57] ABSTRACT

Optical display or projection equipment, using Moire fringes to create moving or animated effects. A transparent sheet carrying special diagrams is superimposed over a moving transparent belt, having a graticule of close parallel lines. The sheet and belt are formed of flexible plastics material. The sheet diagram may be constructed by cutting out sections from a "kit" of pre-printed sheets, and a plurality of sheets may be pivotally attached to a cardboard frame, to build up a complete diagram in successive stages. The apparatus may also include a projector with winding means to convey the belt either from one roller to another roller, across the optical axis, or in a continuous closed loop.

4 Claims, 10 Drawing Figures

PATENTED SEP 17 1974

3,836,240

SHEET 1 OF 6

MOIRE FRINGE OPTICAL DISPLAY & PROJECTION EQUIPMENT

This invention relates to methods and equipment for displaying or projecting moving or "animated" patterns or diagrams, and is particularly though not exclusively applicable to motivated displays or diagrams in which it is required to represent a continuously moving body, such as a rotating gear, or a continuously moving fluid. Thus the invention is of especial utility in connection with fluid flow diagrams representing chemical or biological processes or plants, and also to electrical circuits, and to moving mechanisms involving gear trains, rotating pumps or compressors, and other continuously moving parts.

The invention is based on the known "Moire fringe" effect. Moire fringes are observed when a transparent screen carrying a number of generally parallel spaced dark or opaque lines is moved relative to another screen carrying generally parallel light and dark lines of comparable or different pitch or interval. The observed result to the human eye is that a further third pattern of lines appears to move across the screens. These last lines are the Moire fringe lines, and are of course imaginary in the sense that they do not have physical existence but are somewhat in the nature of an optical illusion.

It has been found that by appropriate design and spacing of the lines or patterns on the two screens the Moire fringes can be caused to move in any direction and at varying speeds relative to the two screens, and relative to the speed and direction of relative movement between the screens. This phenomenon enables quite complicated motivated diagrams to be produced using relatively simple display or projection mechanisms.

A practical problem arises however in producing suitable patterns on the screens for the numerous different diagrams required for different purposes, such as training students or demonstrating apparatus. The graphical work involved in preparing the individual screens is laborious and requires considerable graphical skill.

It is an object of the invention accordingly to provide improved means for producing motivated displays, using Moire fringe effects.

From one aspect the invention consists in a film, sheet or belt for use with optical display or projection apparatus to provide a moving Moire fringe pattern, comprising a flexible thin sheet formed of a synthetic plastics material and sufficiently pliable to be folded or wrapped over a roller, the sheet carrying at least two patterns or areas of closely spaced parallel lines with the pitch intervals or inclinations of the lines differing between the two patterns or areas.

From another aspect the invention consists in a sheet or film for use in the formation of a Moire fringe diagram, the sheet or film having transparent or translucent areas with patterns of coloured or dark lines thereon, so arranged that a moving Moire fringe pattern will be produced in conjunction with a moving graticule screen, the sheet or film being such that portions thereof can be cut out and assembled to form at least part of the required diagram.

The printed sheets preferably have areas designed to produce moving Moire fringe effects having a variety of different directions and/or speeds of movement. Selected areas can be simply cut out of the sheets and applied to a transparent base or supporting surface.

According to a preferred feature of the invention the patterns of lines are arranged in separate bands of different widths or lengths or shapes, and in some forms the patterns of lines are arranged in bands with the lines extending transversely to the lengths of the bands, while in other forms the lines extend parallel with the lengths of the bands. At least some of the patterned areas may be in the form of bands representing bends or corners.

The sheets are conveniently formed of a soft pliable synthetic plastics material such as polyvinylacetate which is preferably self-adhesive when applied to a flat smooth surface.

The invention also consists in a kit or assembly for use in the formation of a Moire fringe diagram, comprising a number of sheets or films as defined, each having different patterns of lines thereon to suit different sizes, attitudes or areas of the required diagram. Furthermore the invention also resides in a Moire fringe diagram formed at least in part by assembling sections cut out of sheets or films, or kits, as defined.

Another object of the invention is to provide means for using Moire fringe patterns in a multiple-stage educational programme, and from another aspect the invention consists in apparatus for producing moving Moire fringe patterns in conjunction with an optical display or projection system having means for moving a graticuled sheet or film across the optical path or gate of the system, comprising two relatively movable sheets or films, each of which is at least partly transparent and one of which has patterns or areas of closely spaced parallel lines designed to form moving Moire fringe effects in conjunction with the moving graticuled sheet or film, and means for selectively locating and registering the two sheets superimposed statically one on the other, or for displacing one sheet relative to the other.

Preferably one of the two sheets or films carries a diagram and one of the sheets has a pattern of closely spaced parallel lines arranged to produce Moire fringes representing movement within the diagram.

The invention is also concerned with the apparatus for projecting the Moire fringe patterns, and according to another aspect of the invention there is provided apparatus for use in projecting a Moire fringe pattern or image comprising a frame for positioning in the optical projection path of a projector and adapted to guide a flexible graticuled transparent belt for movement transversely in a flat run across the optical path and to receive and stationarily support an optical "slide" or transparency adjacent to and parallel with said flat run, the belt and "slide" then being directly superimposed in said optical path, means for supporting the belt wound in a coil on one side of the frame, means on the other side of the frame for pulling the belt across the optical path and winding the belt into a coil, and drive means for operating the pulling means.

The apparatus may form part of an optical projector or may be designed as a separate unit to be attached to an existing projector.

Alternatively the apparatus may be arranged to move a continuous endless graticuled belt in the form of a closed loop. For example the frame may be adapted to carry the entire belt loop in front of the projector so that two runs traverse the optical path, the projector being focussed on the run furthest from the light source. Alternatively the frame may be adapted to guide the belt in a closed loop around the back of the projector, whereby a single run only traverses the optical path.

In a further possible embodiment, the frame may be adapted to twist the belt out of the plane of the run at both ends, and to traverse it around guide means in further planes substantially perpendicular to the first mentioned plane and laterally clear of the run.

Figure 6:
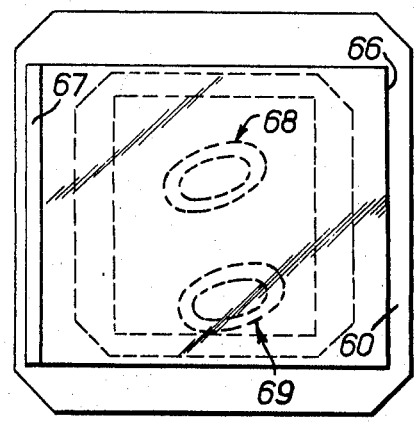
Figure 9:
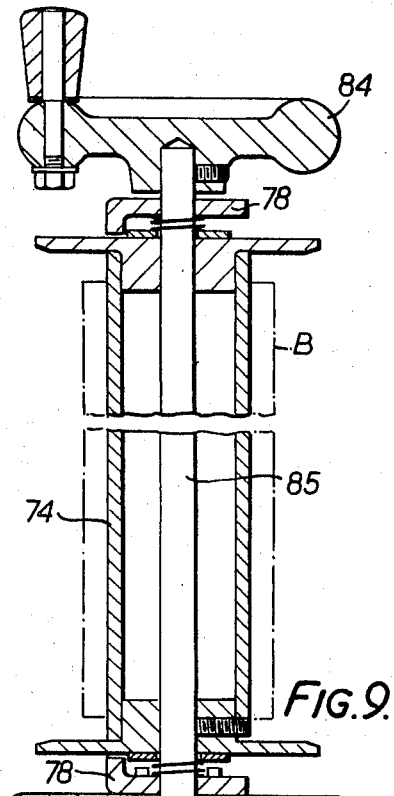
Figure 2:
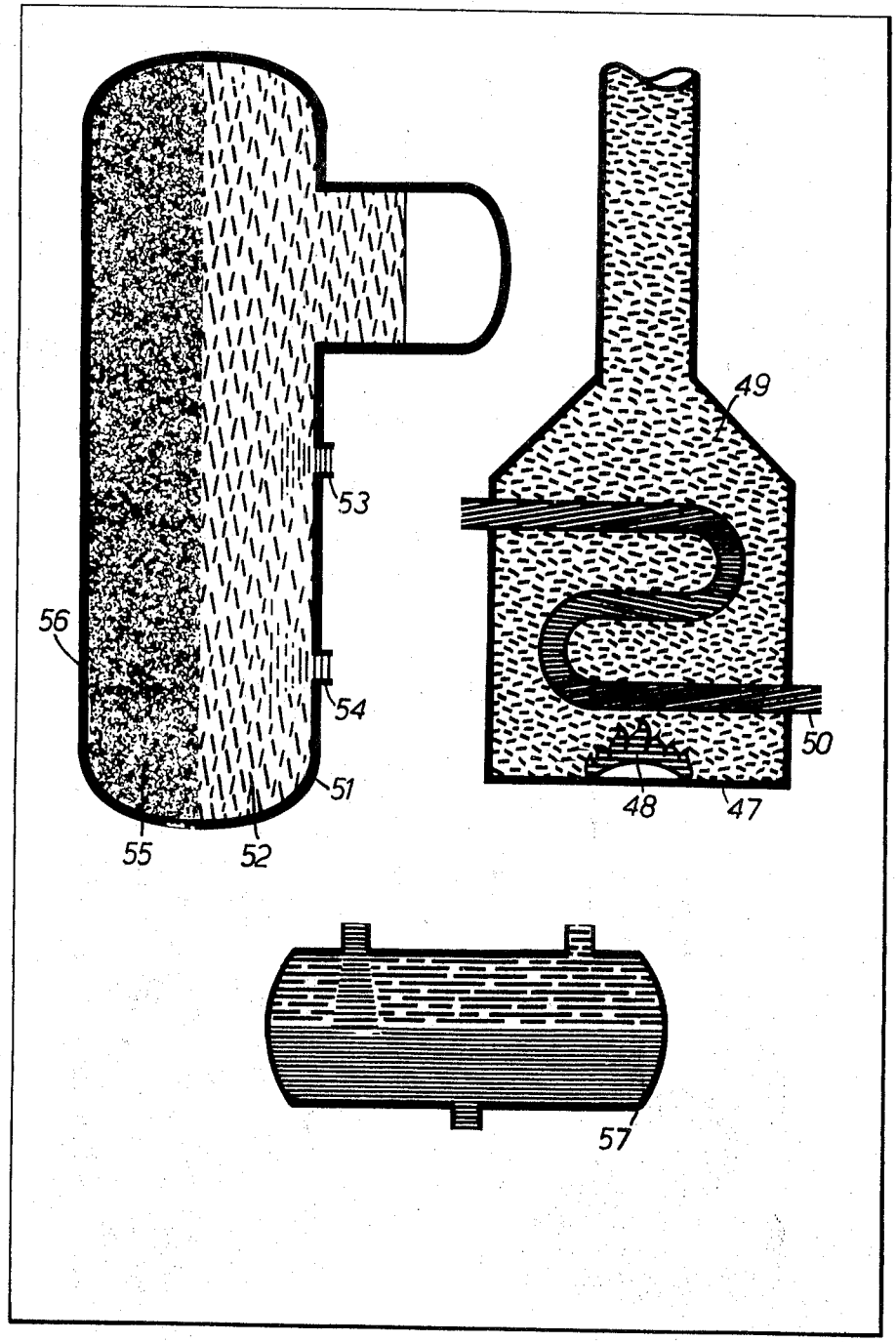
Figure 3:
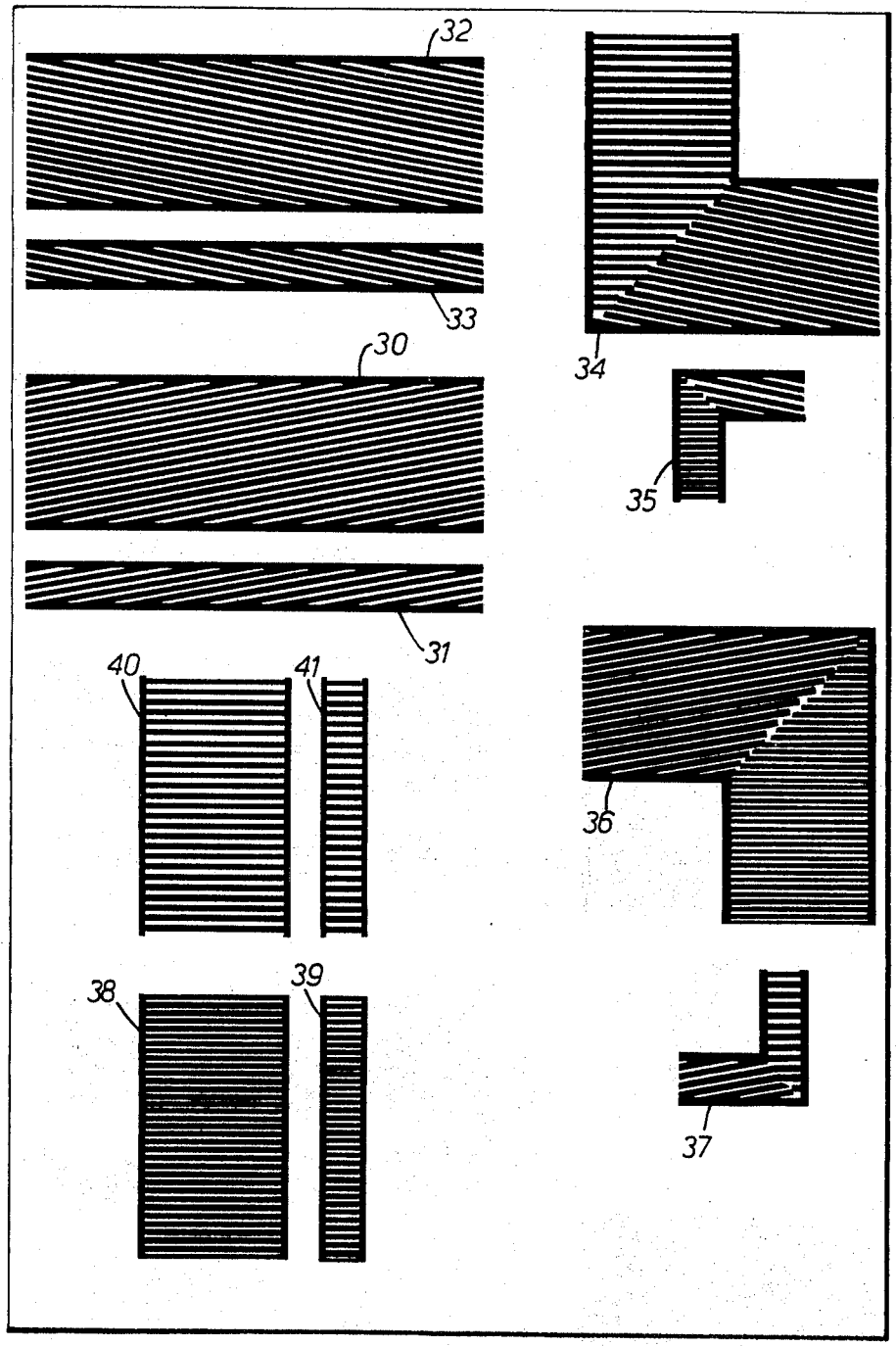
Figure 4:
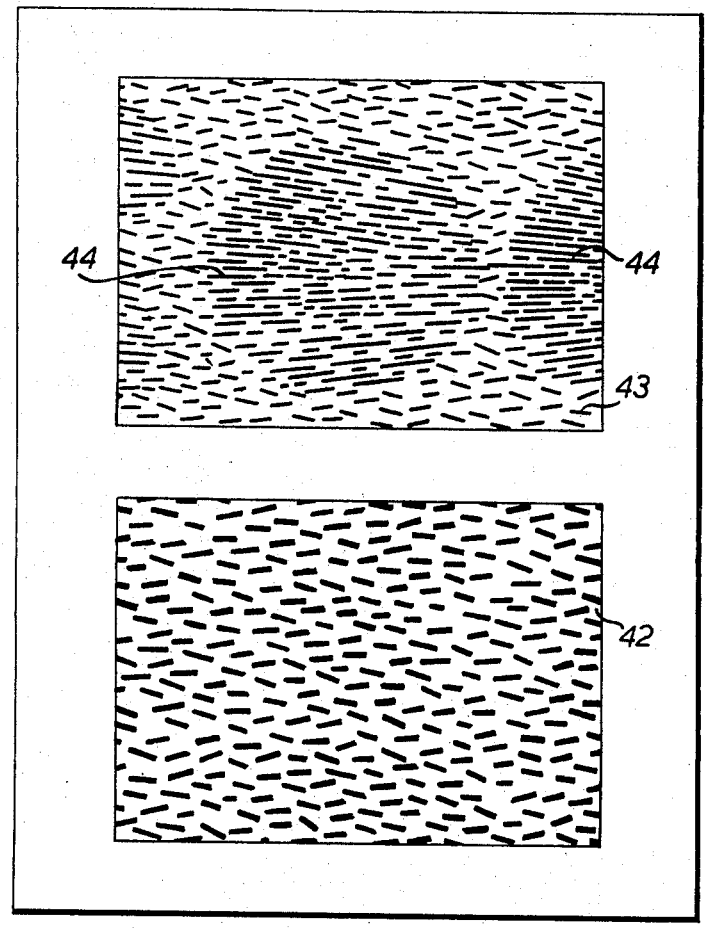
Figure 5:
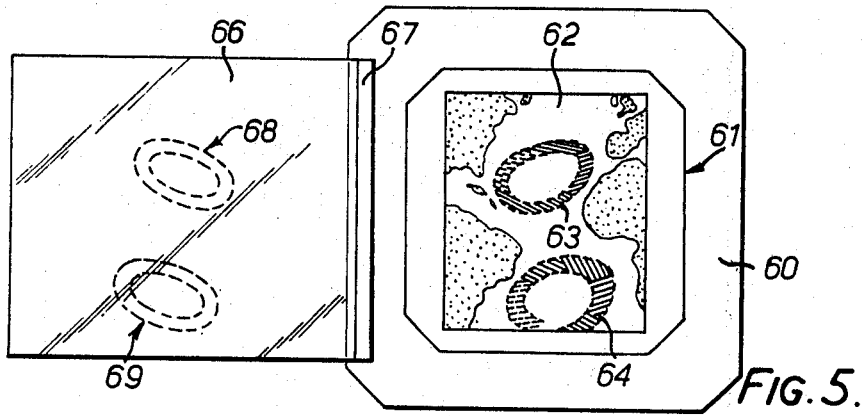
Figure 7:
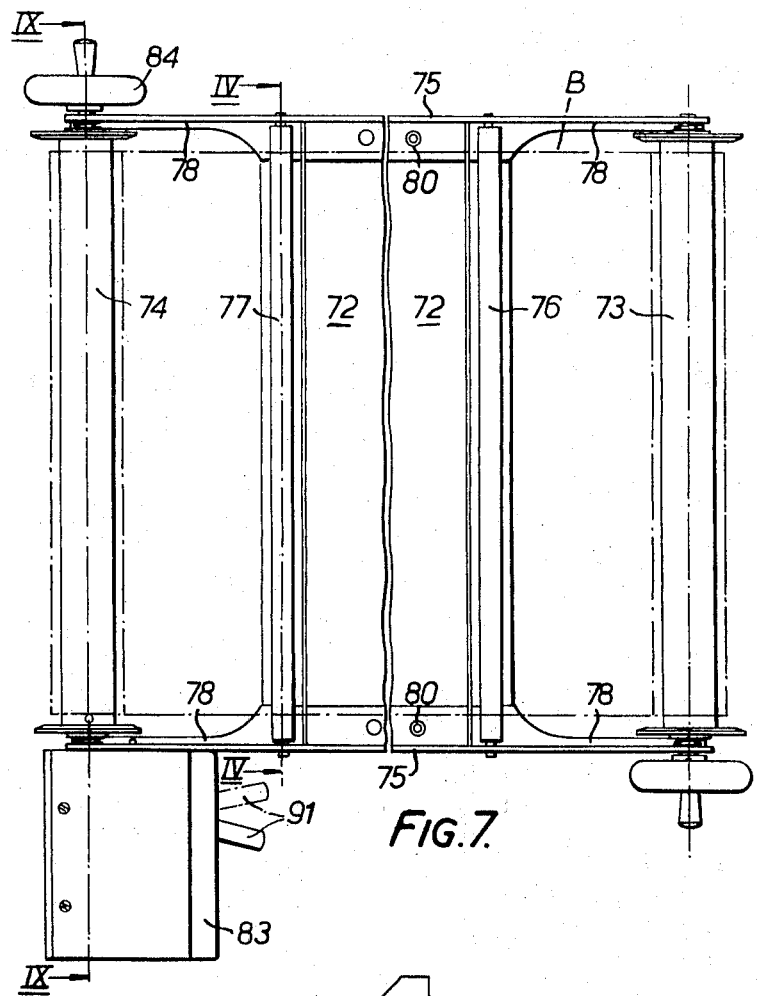
Figure 8:
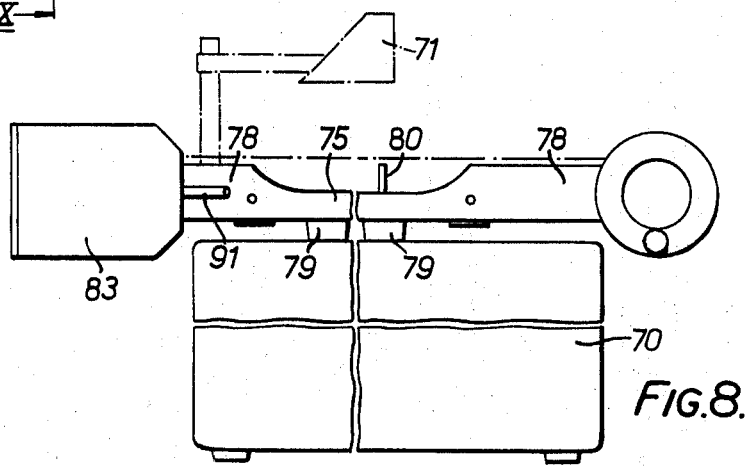
Figure 10:
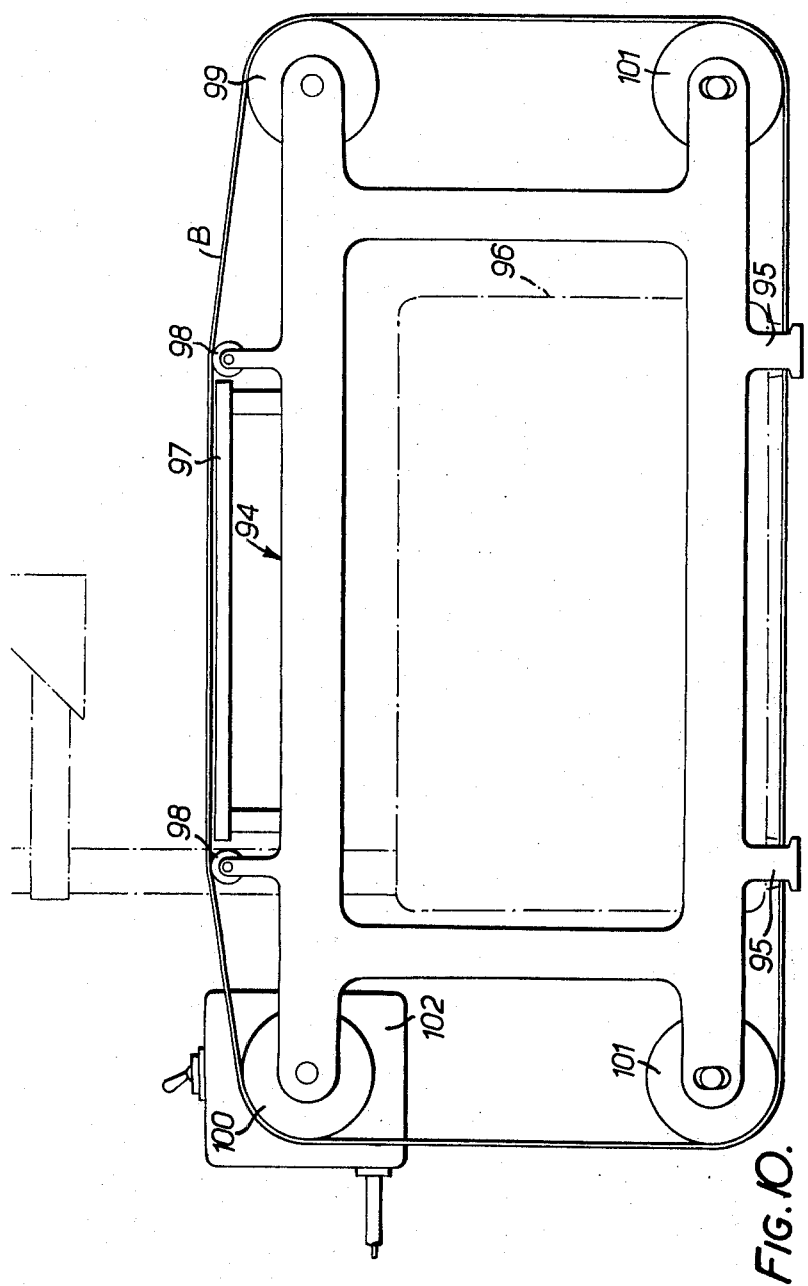

The invention may be performed in various ways and one specific embodiment, with some possible modifications will now be described by way of example with reference to the accompanying drawings, in which:

FIG. 1 is a diagrammatic vertical section through an assembled display apparatus, with which the invention may be performed, FIG. 2 illustrates a specimen sheet carrying markings representing items or components for incorporation into a Moire fringe flow circuit diagram, FIG. 3 shows another sheet carrying markings or patterns representing different movements, FIG. 4 is similar to FIG. 3 and illustrates a sheet with different markings, FIG. 5 is a plan view of another form of apparatus according to the invention for use in a multiple-stage teaching programme, comprising a frame surrounding a first transparent sheet with a second transparent sheet in its displaced position, FIG. 6 is a similar plan view illustrating the second transparent sheet of FIG. 5 located in registry with and overlapping the first sheet, FIG. 7 is a plan view of an "animation" unit for use in conjunction with an optical projector, FIG. 8 is a side view of the unit of FIG. 7, FIG. 9 is a section on the line IX—IX of FIG. 7, and FIG. 10 is a side view of a belt guide frame arranged over an overhead projector.

The apparatus illustrated in FIG. 1 includes a rectangular case or housing 10 with a rectangular aperture 11 in its front wall 12. A flat transparent rigid plastics panel 9, made for example from "Perspex," with a flat smooth polished front surface, is detachably mounted in this aperture, the panel being intended to carry a diagram of a flow path or other "motivated" system. A continuous flexible translucent or transparent graticuled plastics belt 16 extends around upper and lower rollers 14, 15, mounted horizontally in the housing, the front stretch 17 of the belt moving upwardly close behind the front panel 9. The lower roller 14 may be adjustable towards and away from the upper roller, to adjust the tension in the belt 16, and the upper roller is driven continuously at a slow speed by an electric motor 13 acting through a reduction gear. Behind the rear stretch of the belt 16 are mounted a number of elongated fluorescent light tubes 18, and a "milky" translucent plastics diffusing screen 8 may be located vertically between the front and rear stretches of the belt, though this is not usually essential if sufficient clearance exists between these two stretches.

The belt 16 is marked throughout its length on its outer surface with a pattern of parallel, horizontal, closely spaced black lines, of equal width (approximately 1/32 inch for example) the spacing between adjacent lines being equal to the width of the lines. The spaces between the lines may be transparent, or the belt which carries the lines may be translucent and slightly "milky."

The front surface of the transparent front panel 9 is intended to carry or receive diagrams to represent flow paths, mechanisms, chemical or biological processes, electrical circuits, or in general any pattern or diagram in which, or in association with which, a motivated display is required.

The diagram is provided with suitable patterns of lines arranged to create moving Moire fringes in conjunction with the graticuled belt 16. One method of preparing such a diagram is by means of pre-printed sheets of flexible transparent plastics material, carrying a selection of suitable patterns to represent all the usual required movements. Suitably shaped pieces or "masks" are simply cut out of these sheets and applied to the front surface of the panel so as to cover the respective area where this particular fluid movement is required.

FIGS. 2, 3 and 4 represent three specimen sheets, though it will be understood that many other alternative patterns may be provided. The flexible transparent plastics sheets are formed of a non-sticky self-adhesive material which will adhere to the front face of the panel 9 under pressure alone, without any adhesive, so that the masks can be later removed if necessary. Alternatively the sheets may be provided with a permanent transparent adhesive backing.

The three sheets illustrated in FIGS. 2, 3, and 4 are all designed for use with a moving belt having horizontal parallel lines, the run of the belt immediately behind the front panel being arranged to move continuously upwards, as in FIG. 1. The patterns of the sheets may however be re-designed for use in conjunction with a belt which moves downwards, or a belt with vertical lines moving to the left or right.

FIG. 2 illustrates three separate typical components which frequently occur in chemical plants, namely a furnace, re-boiler, and condenser. Each of these three units is designed to be cut out of the sheet as a whole unit and applied to the front of the panel 9.

In FIG. 3 the sections or area 30 in which the lines are inclined downwards to the left is designed to produce Moire fringes which appear to move horizontally to the right. A "mask" cut from this section would normally be applied to a horizontal duct on the main diagram. Since different diagrams will contain flow ducts of different widths or diameters the printed sheet is provided with further sections such as shown at 31 having the same directional flow characteristics, but different vertical heights or widths. These sections such as 30, 31, are conveniently in horizontal bands spaced apart so that they can be cut out with a pair of scissors and trimmed to length to suit the particular diagram.

Section 32 in FIG. 3 has parallel lines inclined downwards to the right and this will produce Moire fringe lines travelling horizontally towards the left. The section 33 has similar characteristics but is of reduced height for the purpose described above. Further sections similar to these areas 30 to 33 may have patterns of lines at different angles of inclination, designed to produce Moire fringe movements in upwardly or downwardly inclined directions. The spacings between these lines, in relation to the spacing between the lines on the moving belt can also be critical.

It is a characteristic of the Moire fringe effect that the Moire fringes appear to move generally in the same direction as the direction of relative movement of whichever of the two screens carries lines at a closer spacing. Section 38 in FIG. 3 has parallel horizontal lines which are at closer intervals than the lines on the moving belt, and a mask cut from this section will therefore produce Moire fringes moving downwards. Section 39 is similar but of reduced width. Section 40 has horizontal lines of larger interval than the lines on the moving belt and this will produce Moire fringes moving upwards, at a faster speed than the belt itself, while section 41 is similar but again of reduced width. Section 34 of FIG. 3 is intended for use at a corner or bend in a flow pipe and is in effect a combination of sections 32 and 40. The resultant Moire fringes will appear to enter horizontally and exit vertically. Section 35 represents another form of bend and here the Moire fringes will appear to enter horizontally and leave vertically downwards. In section 36 the fringes will appear to enter horizontally and exit vertically downwards, while in section 37, of smaller width, the fringes will enter horizontally and exit vertically upwards. In this manner, by simply cutting out suitably shaped lengths or areas from the different sections, "masks" can be produced to provide most normal directions of movement in at least the more simple flow diagrams.

The two printed sections illustrated on the sheet of FIG. 4 are intended to represent larger areas where more general flow occurs. Section 42 carries short flecks arranged generally horizontally but at different inclinations and this section combines with the vertically moving belt to produce an effect of random movement of particles in a fluid. Section 43 has a background area similar to that of section 42 but also includes zones 44 of specially designed markings arranged to produce the effect of vortex rotation of the fluid in each zone.

In the sheet illustrated in FIG. 2 the component 47 represents a diagrammatic furnace including a symbol 48, with horizontal lines, to indicate an upwardly moving flame, a zone 49 suitably marked to suggest generally random upward movement, and an S-shaped conduit 50 having lines of varying inclinations to create Moire fringes which appear to move sinuously round the bends. Section 51 in FIG. 2 is shown vertically but it is intended to be turned through 90° when applied to the front panel 9. This represents a plant component including a zone 52 of generally random movement, zones 53 and 54 indicating flow to and from the vessel, and a zone 55 which has a tangled pattern designed to indicate lack of movement. The third section 57 illustrates another form of chemical apparatus again with internal fluid flow paths.

The apparatus is conveniently supplied as a kit of parts, comprising a number of printed sheets such as are shown in FIGS. 2 to 4, bearing markings representing different items or kinds of movement.

Referring to FIG. 5 the apparatus comprises a frame or surround 60 formed of stiff cardboard or the like, with a central rectangular window 61. Located permanently in this window is a transparent sheet 62 of plastics material such as polyvinylacetate. The sheet may carry a chart, diagram, photograph or the like with or without legends and texts and in the present instance the diagram is a map illustrating the North and South Atlantic Oceans with the main ocean currents. In the North Atlantic the ocean currents are based on a circular system indicated at 63, and this part of the chart is composed of sections of closely spaced parallel lines arranged at appropriate pitch intervals and appropriately inclined from the horizontal so that when used with an underlying moving graticuled sheet having closely spaced horizontal parallel lines of constant pitch a pattern of moving Moire fringe lines will be visible, suggesting circulating movement of the ocean currents around this path. In the South Atlantic there is a similar circulating current system 64 composed of similar closely spaced lines.

The apparatus also includes a second transparent sheet 66 of the same material hinged to the frame 60 by a flexible strip 67 along one edge, so that it can be moved between a withdrawn inoperative position as shown in FIG. 5 and a registered position shown in FIG. 6, where the sheet 66 overlies and registers with the sheet 62. This second sheet 66 carries further information which combines with that on the first sheet to form a second stage in the teaching programme. In this particular example the second sheet may have tracks 68, 69 corresponding to the current paths 63, 64 and marked out in colours corresponding to the differing temperatures at different parts of the streams. Also the second sheet may carry further information such as legends, names, and temperatures.

In this illustrated example the first sheet 62 carries both a diagram and Moire fringe line patterns and the second sheet 66 has no such patterns. This arrangement can be reversed, or both sheets may carry Moire fringe patterns. Additional sheets may also be attached to the unit for use in providing further stages in the teaching programme. These sheets may be similarly hinged to the frame 60 at the same flexible connection 67 or they may be hinged to the frame along other side edges. Instead of hinged connections the secondary sheets may be attached in other ways. For example they may have removable snap fastening devices at their corners or edges to locate with corresponding devices on the frame 60, or they may be arranged to slide into guide grooves or channels formed along opposite sides of the frame 60. When in registry the secondary sheets must of course be positioned accurately relative to the first sheet and to one another.

The unit shown in FIGS. 7 to 9 is designed to be located on a conventional optical projector 70 (indicated in outline in FIG. 8) of the type designed to project images of transparent drawings or other sheets. The projector includes a main housing within which is mounted the projection lamp, and in the upper part of the housing there is a horizontal Fresnel lens mounted in a square or rectangular opening. There are means over this opening, for this form of projector's usual use, for supporting a slide whose image is to be projected. Above the slide position is an optical projection system 71 including a prism for directing the projected image horizontally onto a remote viewing screen, the optical system being designed to enlarge the image considerably.

The unit shown in the drawings will be located in the upper part of the main housing and may be permanent or removable. The unit comprises a guide 72 to fit over the existing Fresnel lens with a supply roller 73 at one side and a motorised winding roller 74 at the other side. The guide 72 comprises a flat, horizontal, transparent rigid sheet held in a rectangular frame 75 between idler rollers 76, 77 to act as a support for a moving belt B. The rollers 73, 74 are carried by extension arms 78 projecting from opposite ends of the frame 75, which also acts as a support for a stationary slide (not shown) which can thus be positioned horizontally immediately above the belt. The slide and belt will be patterned with lines to create Moire fringes that alter and move with the movement of the belt as described above.

The frame has four pads 79 on its underside near the corners for supporting it on the projector and two locating pins 80 upstanding from its upper side accurately to position conventional slides. The pads 79 may be made adjustable in order that the frame can be accurately levelled, and there may also be means, such as pins and sockets, for accurately locating the frame in the projector housing.

The motorised winding roller 74 is normally driven by an electric motor 81 through a manually operated clutch 82 mounted in a housing 83 fixed outside one of the extension arms 78. The motor 81 preferably has reduction gearing (not shown) associated therewith as for most purposes the roller 74 is required to be turned slowly. Provision is also made for manual rotation of the roller 74 by means of a handle 84 fixed to the end of its spindle 85 that projects through the other extension arm 78.

The motor 81 has a drive shaft 86 which is co-axial with the spindle 85 and is entered in a bore 87 in the end of that spindle projecting through and beyond the associated extension arm 78. A clutch member 88 forms a collar-like attachment to the shaft 86 and is engageable by an axially movable second clutch member 89 sleeved over the end of the spindle 85. The clutch member 89 is forked at the end remote from the clutch plate and a pin 90 passing through the spindle 85 engages between the tines of the fork so that the clutch member 89 rotates with the spindle 85 whether engaged with or disengaged from the clutch member 88. The engagement of the clutch is controlled by a lever 91 one end of which projects from the housing 83 and the other end of which is forked to embrace the clutch member 89, engaging in an annular groove 92 thereof so that the clutch member 89 is free to rotate. A ball catch 93 co-operates with one of the forks of the lever 91 to hold the clutch disengaged (as shown in FIG. 9) or engaged. The engaged position of the lever is shown in broken lines in FIG. 7.

When the clutch 82 is engaged the motor will drive the winding roller at a predetermined slow speed as appropriate to the required rate of movement of the Moire fringe patterns. When the clutch is disengaged the belt can be rewound on to the supply roller 2 of the first side of the guide, which is provided with a handle 12 for that purpose.

Instead of a belt that has to be rewound, an endless belt may be provided and arranged to be progressed continuously around its loop, as will now be described.

Referring to FIG. 10, a frame 94 is adapted to stand on four legs 95 straddling an overhead projector indicated in outline at 96. The optical path of the projector extends vertically upwards through a clear space in the middle of the frame to focus at the top surface of a transparent belt support table 97, followed by horizontal refraction and enlargement, as before. An endless flexible belt B has one flat run traversed across this horizontal table 97, beyond the ends of which it runs over idler rollers 98 and around main rollers 99 and 100 and gravitational tension rollers 101 so that a lower horizontal run extends beneath the projector 96 between the legs 95. The roller 100 is the driving roller to move the belt around its loop and the motor 102 therefor is also mounted on the frame. The belt support table 97 is also adapted to hold in a stationary position on its upper surface an optical screen or slide.

In another endless belt embodiment a guide frame is adapted to sit on top of the projector and pass two belt runs across the optical path. The top run of the belt slides over the optical screen or slide located on the guide frame and on which the light beam from the projector is focused. The lower run of the belt is out of focus and will merely reduce the projected light intensity.

Alternatively, the top run of the belt across the slide and support table may be between two pairs of horizontal pinch rollers. Beyond these there are two pairs of vertical pinch rollers whose nips are aligned with the centre of the top run and whose mid-points are on a level with that run. Offset laterally to the same side there are two vertical guide rollers and, one of which may be a belt driving roller and the other of which may be a tensioning roller.

Beyond the ends of the top run the belt is twisted out of the horizontal plane into a vertical plane at the nips of the vertical pinch rollers. The belt is then guided laterally clear of the top run around the other vertical rollers. With this arrangement there can be just one run across the optical path of the projector without the disadvantage of having to guide the non-working part of the belt around the back of the projector.

In another embodiment of the invention the power operated roller system for moving the graticuled flexible belt is omitted and replaced by a simple hand operated roller system, with one roller on each side of the optical projection unit. The flexible graticuled belt can slide directly across the normal opening or transparent window provided in the top of the projector. The unit also includes a device for holding the stationary transparent Moire fringe diagram immediately above the movable belt. This device may be a simple bridge spanning across the moving belt with a slot for the passage of the belt, the bridge also carrying a resilient clip to grip the stationary diagram. Instead of a bridge there may be two clips to hold the diagram, one clip on each side of the belt. Alternatively there may be a pair of spaced pins, one on each side of the path of the belt, to locate in holes at the corners of the stationary diagram, and the pins may have flanges or shoulders to raise the diagram a short distance above the moving belt.

The hand operated system may be constructed as a complete self-contained removable unit including rollers and hand cranks or the hand operated system may be an integral part of the projector unit.

We claim:

1. Apparatus for producing moving Moire fringe patterns in conjunction with an optical display or projection system comprising means for moving a graticulated sheet or film across the optical path or gate of the system, a frame carrying two relatively movable sheets or films, each of which is at least partly transparent and one of which has patterns or areas of closely spaced parallel lines designed to form moving Moire fringe effects in conjunction with the said moving graticulated sheet or film, having means for selectively locating and registering the said two sheets in a first position in which they are superimposed statically one on the other, and for displacing one sheet into a second position relative to the other sheet so as to be totally clear of the said other sheet, said graticulated sheet or film comprising a belt and means to guide said belt for movement transversely in a flat run across said optical path with said frame parallel to said flat run, means for supporting the belt wound in a coil on one side of said apparatus, means on the other side of said apparatus for pulling the belt across said optical path and winding the belt into a coil, and drive means for operating said pulling means.

2. A sheet or film according to claim 1, in which at least some of the patterns or areas are in the form of bands representing bends or corners, and the patterns of lines are inclined at different angles on either side of each bend or corner such that the resultant moving Moire fringe pattern will travel round the bend or corner.

3. Apparatus according to claim 1, in which one of the two sheets or films carries a diagram and one of the sheets has said patterns or areas of closely spaced parallel lines arranged to produce Moire fringes representing movement with the diagram.

4. Apparatus according to claim 1, including means for movably or removably attaching the second sheet to the said frame.

* * * * *